INVENTOR.
Frank P. Biondo
BY
W. S. Pettigrew
ATTORNEY

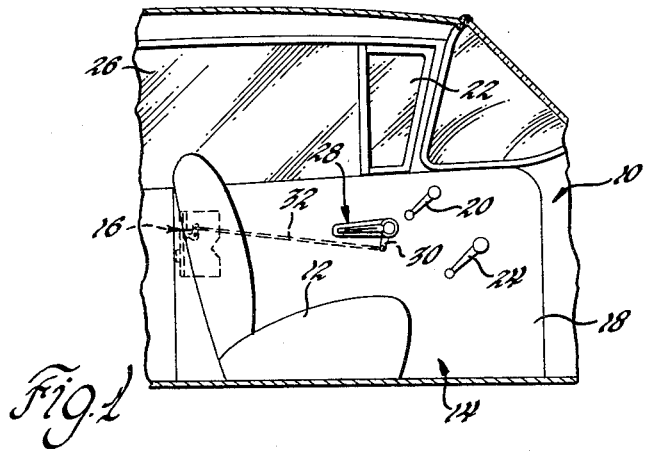
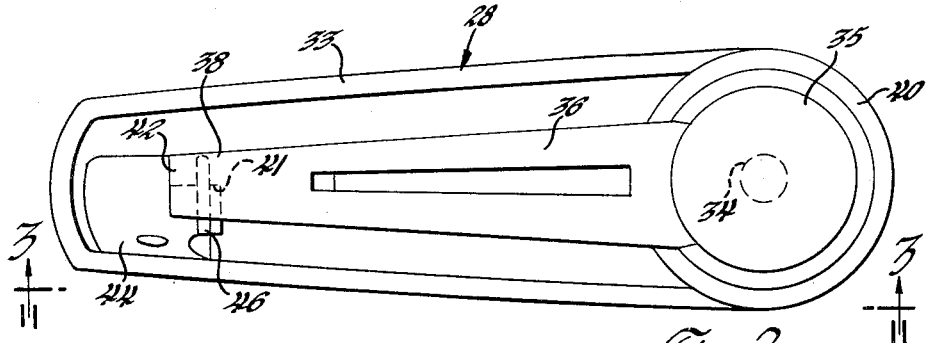
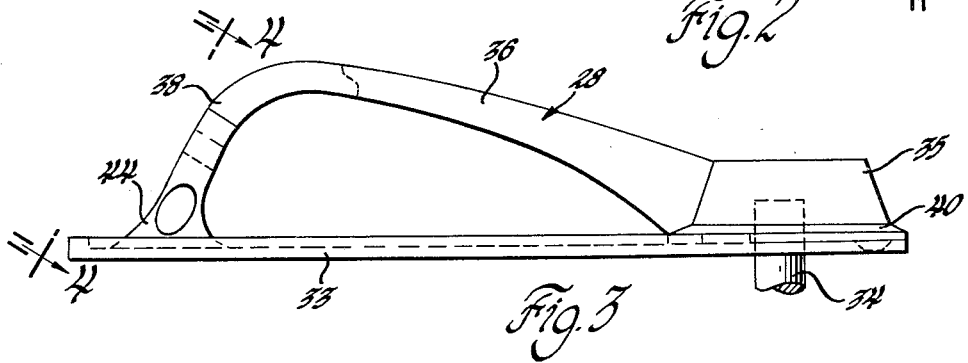
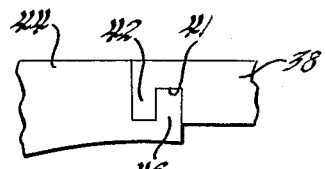

Feb. 6, 1962  F. P. BIONDO  3,020,076
COMBINED DOOR HANDLE AND PULL-TO FOR VEHICLE DOOR
Filed June 15, 1960  3 Sheets-Sheet 3

INVENTOR.
Frank P. Biondo
BY
W. S. Pettigrew
ATTORNEY 3,020,076
COMBINED DOOR HANDLE AND PULL-TO
FOR VEHICLE DOOR
Frank P. Biondo, Detroit, Mich., assignor to General Motors Corporation, Detroit, Mich., a corporation of Delaware
Filed June 15, 1960, Ser. No. 36,406
3 Claims. (Cl. 292—336.3)

This invention relates to a combined door handle and pull-to for a vehicle door, and more particularly to an inside turn handle which is arranged to act also as a pull-to for the door.

One feature of the invention is that it provides an improved combined door handle and pull-to for a vehicle door. Another feature of the invention is that the handle is formed with a portion adapted to interlock with a member projecting from the door to prevent the free end of the handle from being pulled away from the door. A further feature of the invention is that the handle is formed with an undercut notch adjacent its free end adapted to interlock with a hook formed on the member which projects from the door, the interlocking arrangement preventing the handle from being pulled away from the door but permitting the handle to be turned to operate the door latch.

Other features and advantages of the invention will be apparent from the following specification and from the drawings, in which:

FIGURE 1 is a fragmentary longitudinal section through the front compartment of an automobile body showing the inner surface of the front door which has the improved combined door handle and pull-to mounted thereon;

FIGURE 2 is an enlarged plan view of the combined handle and pull-to;

FIGURE 3 is an elevational view taken along the line 3—3 of FIGURE 2;

FIGURE 4 is a detail view taken along the line 4—4 of FIGURE 3;

Figure 5:
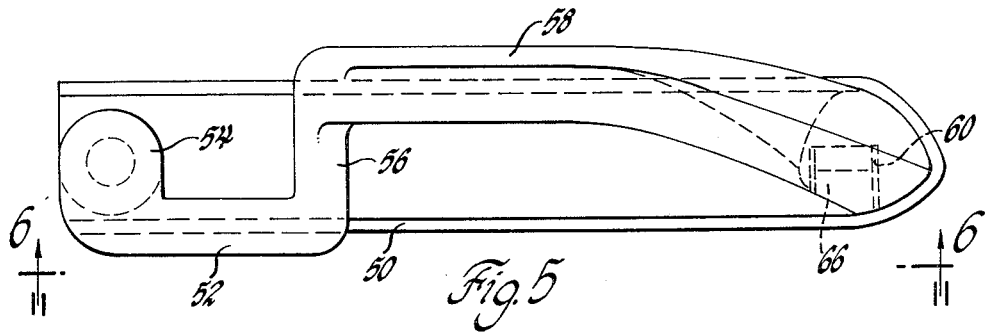
FIGURE 5 is a view similar to FIGURE 2 but showing a modified form of the invention.

It is conventional in modern automobiles to provide an inside turn handle which is pivotally mounted on the inner panel of the automobile door and is connected to the door latch so that the latch is operated when the handle is turned. Certain makes of automobiles also provide a separate pull-to device mounted on the door which is adapted to be grasped by the passenger in order to pull the door closed. However, whether or not such a separate pull-to device is provided, it often happens that the passenger uses the inside door handle to pull the door shut. During the pull-to operation the passenger may inadvertently turn the handle so that when the door closes the latch does not catch, being held in released position by the handle mechanism, so that the door bounces back to safety position or to fully unlatched position.

This invention provides a novel combined door handle and pull-to device in which the turn handle is formed adjacent its free end with an undercut notch adapted to engage a complementary hook formed on a member projecting from the door so that, when the handle is in its normal position toward which it conventionally is spring biased, the free end of the handle may not be pulled away from the door and the interlocking engagement of the complementary notch and hook portion also provides a frictional component which resists inadvertent turning of the handle when the handle is being used as a door pull-to.

Referring now more particularly to FIGURES 1–4 of the drawings, an automobile designated generally as 10 has a front passenger compartment in which is mounted a seat 12, access to and from the passenger compartment being by means of a door designated generally as 14. The door is hingedly mounted at its front edge on the automobile body in conventional manner (not shown) and the door mounts a latch 16 having a bolt adapted to engage a striker (not shown) mounted on the automobile body to hold the door closed. For a full disclosure of a suitable latch and striker arrangement, reference may be had to Cockburn et al. Patent No. 2,871,049. Since the latch and the striker form no part of the present invention and since these parts are well known and understood in the art, no further description will be given here.

The inner surface of the door is formed by a fabric-covered door inner panel 18 which mounts a crank 20 for operating a pivoted window 22 which is carried by the door and a crank 24 for operating a vertically slidable window 26 which is also carried by the door. An inside turn handle arrangement designated generally as 28 is mounted on the door inner panel and is connected to the latch 16 by means of a lever 30 and a connecting rod 32.

The detailed construction of the turn handle arrangement 28 is shown in FIGURES 2, 3 and 4. A mounting plate 33 is secured by screws or other means to the door inner panel 18 and a handle is pivotally mounted on the mounting plate 33 for turning movement about the axis of a handle shaft 34 which is connected to the crank lever 30 shown in FIGURE 1. The handle comprises a circular mounting end portion 35, an elongated gripping portion 36 which extends from the mounting portion 35 in spaced relation to the door to provide space for an operator's hand between the gripping portion of the handle and the door inner panel, and a free end portion 38 which is a continuation of the gripping portion 36 and which extends outwardly toward the door. A bezel 40 surrounds the pivoted end 35 of the handle to provide an ornamental appearance and to close any opening in which an operator's clothing might become caught. Adjacent the free end of the portion 38 the handle is formed with an undercut notch 41 as shown best in FIGURES 2 and 4, the notch being so located that a wall portion 42 thereof extends toward the door inner panel.

A member 44 projects from the mounting plate 34 toward the free end of the handle and at its end the member 44 is provided with a hook 46 which is complementary to the undercut notch 41 so that when the handle is in its normal position, toward which it is spring biased in conventional manner (not shown), the hook 46 enters the notch 41 and interlocks with the wall portion 42 of the notch to prevent the free end of the handle from being pulled away from the door. In the event the handle is grasped and used as a door pull-to, the interlocking arrangement will prevent pulling the free end of the handle away from the door thus preventing damage to the handle arrangement particularly in the event the door strikes a curb or other obstruction so that it is difficult to close. Furthermore, force exerted on the handle tending to move its free end away from the door will create a frictional component due to interengagement of the interlocking parts 42, 46 and so make it difficult to turn the handle as it is being pulled in the event the passenger inadvertently exerts a turning force. This is important because if the handle is turned when the door is closed the latch will be held in released position and the latch and striker parts will not catch to hold the door closed.

Figure 6:
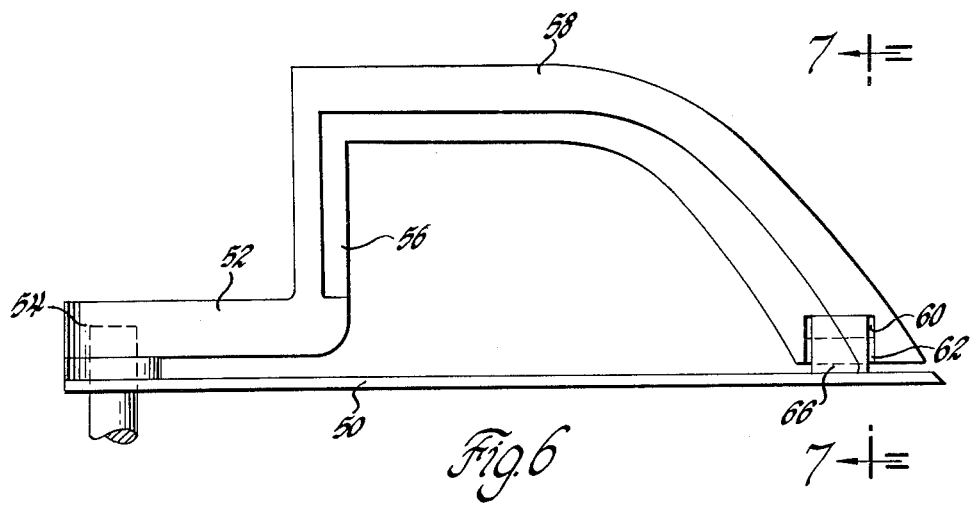
FIGURE 6 is an elevational view of the device shown in FIGURE 5 taken along the line 6—6 of FIGURE 5.
Figure 7:
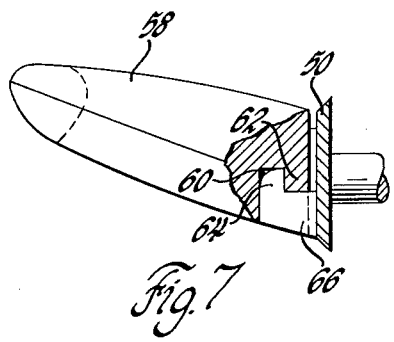
FIGURE 7 is a detail section taken along the line 7—7 of FIGURE 6.

FIGURES 5, 6 and 7 show a modified form of the invention in which a mounting plate 50 is secured to the door inner panel. In this form of the invention the handle is of irregular configuration, having a mounting portion 52 which extends parallel to the surface of the mounting plate 50 and which is pivotally mounted on the mounting plate at its end 54. An intermediate portion 56 of the handle extends at right angles from the mounting portion 52 in a direction inwardly of the automobile passenger compartment and a gripping portion 58 extends from the intermediate portion 56 in a direction parallel to and spaced from the door inner panel, the gripping portion bending back toward the door inner panel and terminating at its free end closely adjacent thereto. Adjacent the free end of the handle there is an undercut notch 60 having a wall 62 for interlocking engagement with a complementary hook 64 formed at the end of a member 66 which projects from the mounting plate 50.

The operation of this form of the invention is similar to that described in connection with FIGURES 1–4. When the door is closed, the handle is spring biased to a position wherein the hook 64 is received in the notch 60 so that the hook and the end wall 62 of the notch interlock to prevent the free end of the handle from being pulled away from the door. This insures that the handle will not be damaged when used as a pull-to and also provides a frictional component when the door is being pulled shut by the handle to decrease the likelihood that the handle will inadvertently be turned during this operation.

Figure 8:
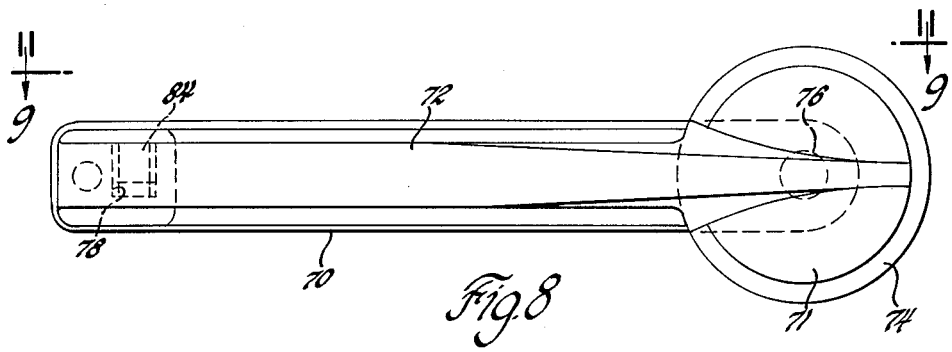
FIGURE 8 is a view similar to FIGURE 2 but showing another modified form of the device.
Figure 9:
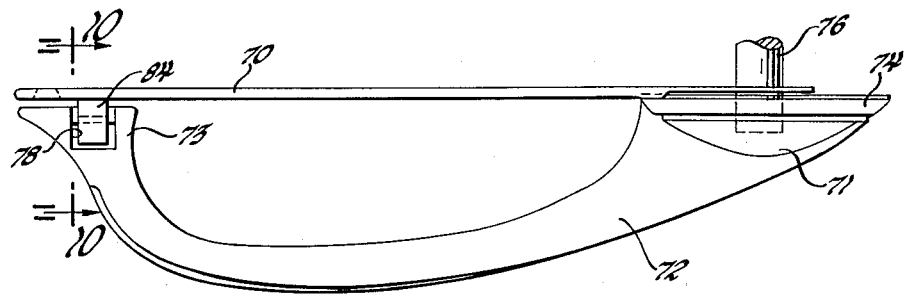
FIGURE 9 is an elevational view taken along the line 9—9 of FIGURE 8.
Figure 10:
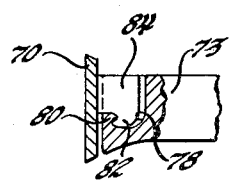
FIGURE 10 is a detail section taken along the line 10—10 of FIGURE 9.

FIGURES 8, 9 and 10 show another modified form of the invention in which there is a mounting plate 70 secured to the door inner panel and pivotally mounting a handle having a circular end mounting portion 71, an elongated gripping portion 72, and a free end portion 73. A bezel 74 surrounds the handle shaft 76. Adjacent its free end the handle is formed with an undercut notch 78 having an end wall 80 closely adjacent the mounting plate 70 and adapted to cooperate with the complementary hook 82 formed on a member 84 which projects from the mounting plate 70. The operation is the same as in the embodiments earlier described. The interlocking engagement of the hook 82 with the end wall 80 of the undercut notch 78 prevents the free end of the handle 72 from being pulled away from the door and at the same time this interengagement provides a frictional component during the time that force is being exerted on the handle to pull it away from the door to minimize the likelihood that the handle will be turned as it is pulled.

While I have shown and described certain embodiments of my invention, it is capable of many modifications. Changes, therefore, in the construction and arrangement may be made without departing from the spirit and scope of the invention, as set forth in the appended claims.

I claim:

1. In combination in a vehicle body having a door and a latch for holding the door closed, a handle pivotally mounted on the door; means connecting said handle to the latch whereby the latch is operated upon turning the handle, said handle having an undercut notch spaced from its pivotal mounting; and a member projecting from the door having an interlocking hook which is complementary to said notch and is adapted to interlock with said notch to prevent the handle from being pulled away from the door.

2. In combination in a vehicle body having a door and latch for holding the door closed, a handle pivotally mounted at one end on the door; means connecting said end of the handle to the latch whereby the latch is operated upon turning the handle, said handle having an undercut notch adjacent its free end; and a member projecting from the door and having an interlocking hook which is complementary to said notch and is adapted to interlock therewith to prevent the free end of the handle from being pulled away from the door.

3. In combination in a vehicle body having a door and a latch for holding the door closed, a mounting plate on the door; a handle pivotally mounted at one end on said mounting plate; means connecting said end of the handle to the latch whereby the latch is operated upon turning the handle, said handle having an undercut notch adjacent its free end; and a member projecting from said mounting plate and having an interlocking hook which is complementary to said notch and is adapted to interlock therewith to prevent the free end of the handle from being pulled away from the door.

References Cited in the file of this patent

FOREIGN PATENTS 421,023    Great Britain _____ Dec. 12, 1934